Figure 1:
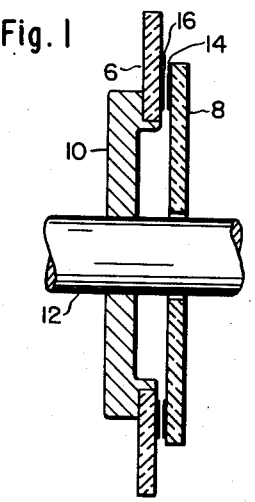

March 9, 1954 — R. S. CHILDS — 2,671,892
MEASURING DEVICE
Filed Nov. 6, 1948 — 3 Sheets-Sheet 1

INVENTOR
ROBERT S. CHILDS
BY
ATTORNEYS

March 9, 1954    R. S. CHILDS    2,671,892
MEASURING DEVICE
Filed Nov. 6, 1948    3 Sheets-Sheet 2

INVENTOR
ROBERT S. CHILDS
ATTORNEYS

March 9, 1954  R. S. CHILDS  2,671,892
MEASURING DEVICE

Filed Nov. 6, 1948  3 Sheets-Sheet 3

INVENTOR
ROBERT S. CHILDS
BY
ATTORNEYS

Patented Mar. 9, 1954

2,671,892

UNITED STATES PATENT OFFICE 2,671,892

MEASURING DEVICE

Robert S. Childs, South Sudbury, Mass., assignor, by mesne assignments, to Edward G. Martin, Cambridge, Mass.

Application November 6, 1948, Serial No. 58,651

10 Claims. (Cl. 340—195)

The present invention relates to improvements in the measuring device described in my co-pending application Serial No. 794,192, filed December 27, 1947, now Patent No. 2,650,352, dated August 25, 1953. More particularly this invention involves a means for reducing or eliminating undesirable capacitive coupling between the input and output of the measuring device.

The aforementioned device depends for its operation upon inductive coupling between a rotor, to which in the preferred embodiment high frequency voltage is applied, and a stator. For reasons explained in said application a non-ferrous core is used for the stator and rotor and the inductively induced voltage in the secondary member is a small fraction of the voltage imposed on the primary. At the same time the windings of the stator and rotor which oppose each other across a narrow air gap constitute a substantial distributed capacitance, and at the high frequency (preferably of the order of 100 kilocycles per second) used in this device, the capacitive coupling between stator and rotor becomes correspondingly large; that is, the capacitive voltage appearing in the secondary output becomes substantial. As a result of the small inductive voltage and of the high stator-to-rotor capacitive coupling, the capacitive component of the output voltage may be of such size as to mask the inductive voltage. Furthermore, the magnitude of the capacitive component varies with the relative positions of the stator and rotor. The apparatus is primarily for the purpose of distinguishing the angle of rotor rotation by the magnitude of inductive output voltage. However, the effect of the large capacitive voltage is to render it difficult to determine the inductive voltage accurately.

The principal object of this invention is to reduce or eliminate distributed capacitive effects without impairing the inductive coupling upon which the accurate measurement of small angular displacement depends.

With this object in view, the present invention comprises an improvement in the apparatus described in my prior application, said improvement consisting in the use of a continuous rotor winding with external connections made across a diameter and, in addition, the splitting of the stator winding into a number of equal sections which may be parallel-connected. This arrangement results in eliminating or at least substantially minimizing capacitive voltages.

Another object is the development of a self-synchronous device which by means of simple switching may use the same apparatus as both the coarse and fine measuring elements, both of which are necessary in some servomechanism applications. The sectors of the stator according to this invention can readily be connected either to utilize the capacitive output voltage for coarse (sometimes called low-speed) measurement, or in a manner whereby the capacitive voltage is substantially eliminated and the inductive voltage remains for the fine (sometimes called high-speed) measurements.

A still further object is to provide simple means for leading in the input voltage to or leading out the error signal voltage from the rotor of the apparatus in such a way that no torque reaction is exerted on the delicate prime mover to which the rotor may be attached for measurment purposes. The present invention contemplates means for eliminating the usual brush and slip-rings with their resultant inaccuracy due to counter-torque in the measuring device. Elimination of this counter-torque makes possible a servomechanism system that is able to take full advantage of the inherent precision of the multi-conductor, non-capacitive device about to be described.

Figure 2:
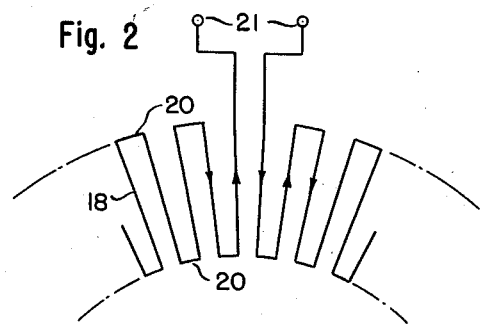
Figure 3:
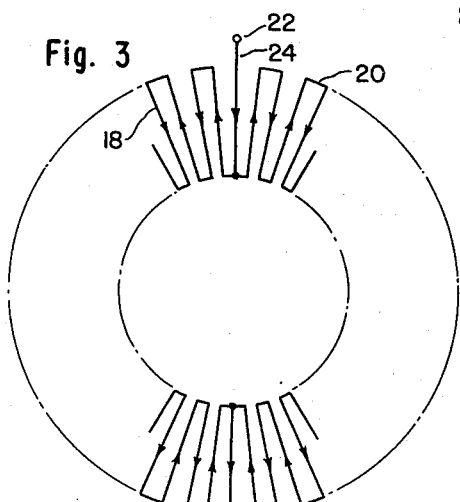
Figure 4:
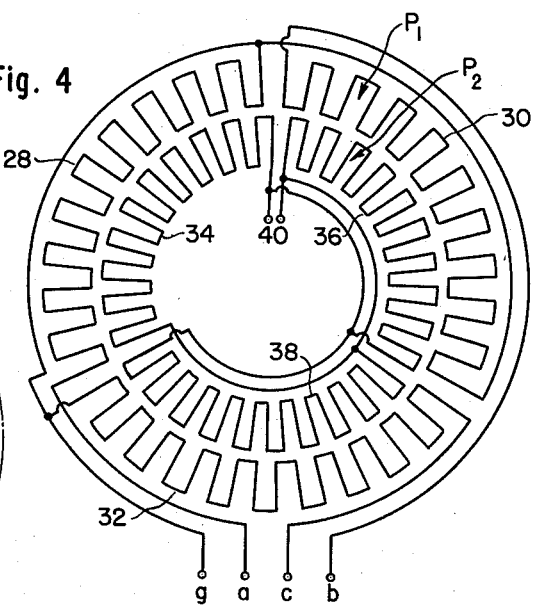
Figure 5:
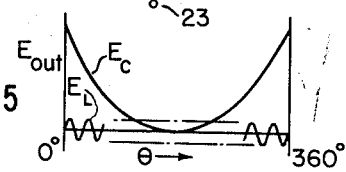
Figure 6:
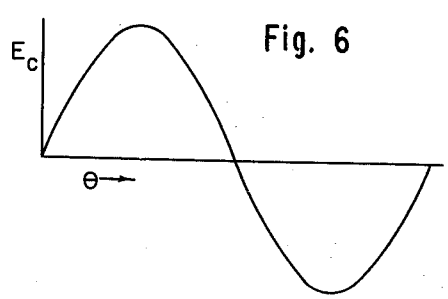
Figure 7:
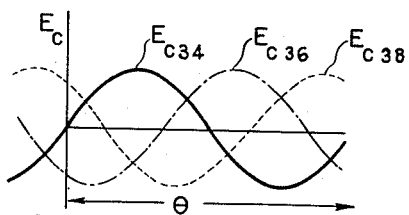
Figure 8:
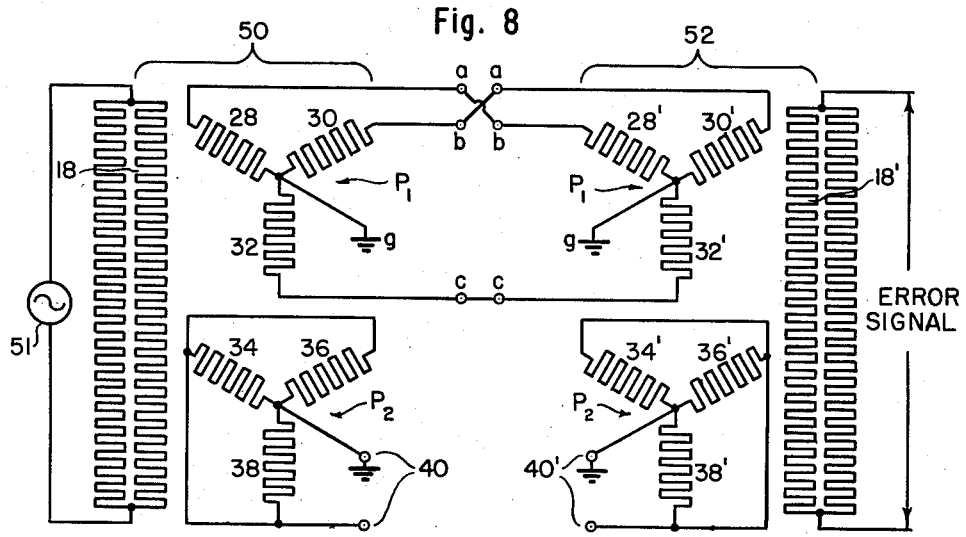
Figure 9:
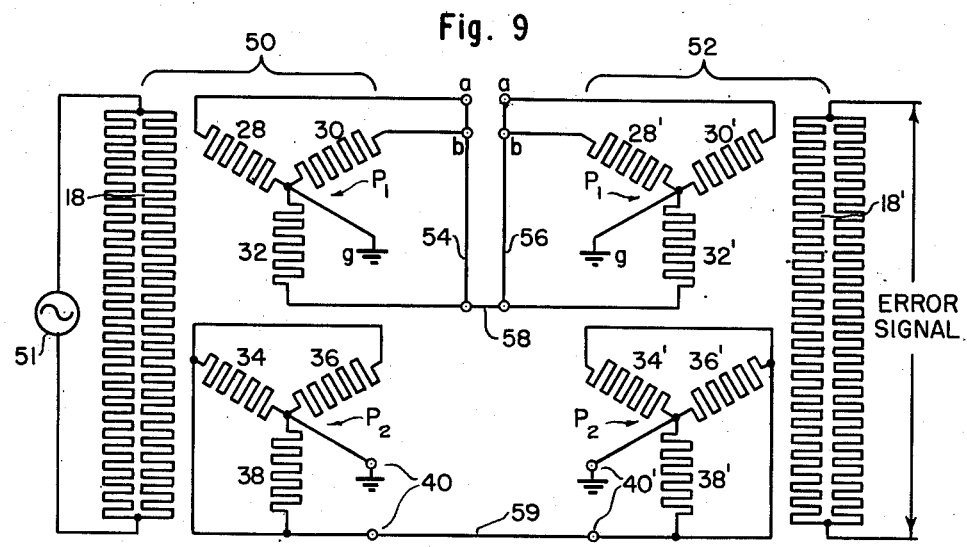
Figure 10:
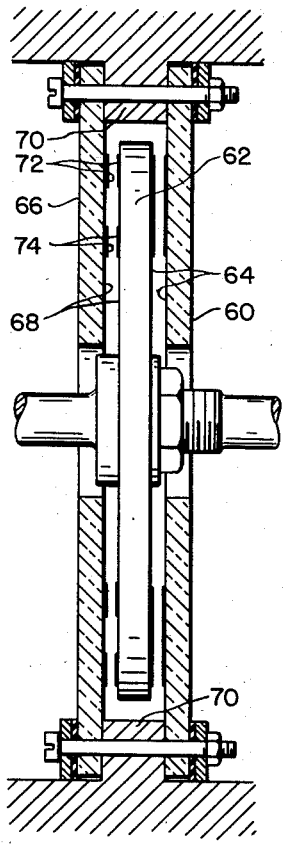
Figure 11:
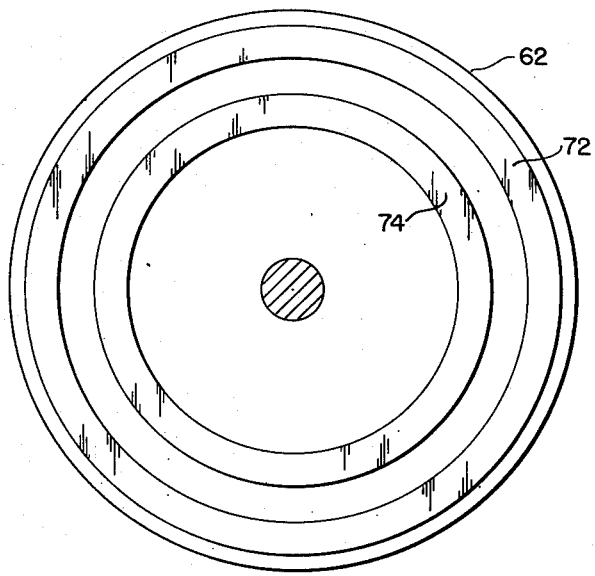
Figure 12:
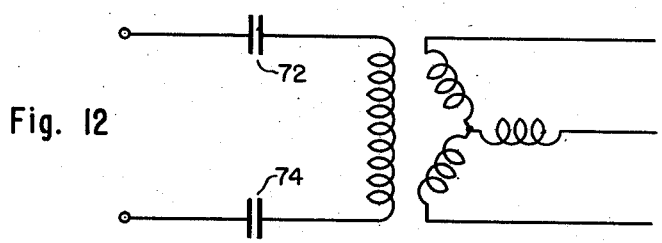

In the accompanying drawing, with the aid of which I will describe my invention, Fig. 1 is a sectional elevation view of the device described in my prior application; Fig. 2 is a detail view of the type of winding used on both rotor and stator of that device; Fig. 3 is a view of the winding and connections according to this invention; Fig. 4 is a view of the windings of the sectionalized member, preferably the stator, which is here shown as a two-phase device; Fig. 5 is a graph showing the variation in capacitive voltage output with rotor angular displacement for the device of my prior application; Fig. 6 is a graph of the capacitive output voltage vs. rotor displacement for the closed diameter-connected rotor of my present invention when employed in conjunction with a stator having a winding of the type shown in Fig. 2; Fig. 7 is a graph of the capacitive output voltage vs. rotor displacement for the closed diameter-connected rotor when employed in conjunction with a multiple-section parallel-connected stator winding; Figs. 8 and 9 are circuit diagrams showing how a two-phase device according to the present invention would be used in a servomechanisms application, Figs. 8 and 9 showing the coarse and fine connections, respectively; Fig. 10 is a view, partly in section, of apparatus incorporating the present invention; Fig. 11 is a plan view of a part of the device shown in Fig. 10; and Fig. 12 is the circuit diagram equivalent of the same device.

The illustrated embodiment of the invention (Fig. 1) comprises a primary member 6 and a secondary member 8, of which one, preferably the primary, is a rotor, while the other is a stator. As shown in Fig. 1, the stator and rotor may comprise disks, preferably of glass, arranged face to face with as small an air gap between them as possible. The rotor is suitably mounted on a hub or spider 10 which in turn is mounted on a shaft 12. The stator carries a deposited metal conductor indicated by heavy lines 14 in Fig. 1 and the rotor carries a deposit 16 opposed to deposit 14.

The windings described in my prior application are shown in Fig. 2 for comparison with the windings in accordance with my improvement shown in Figs. 3 and 4. Both the stator and rotor deposits comprise fine grid-like structures arranged around the peripheries of the disks. The conductor 18 comprises a single conductor arranged in zig-zag or back-and-forth fashion whereby there is formed a succession of juxtaposed series-connected "bars." In this form of the invention the bars are radially disposed. The individual bars are connected at their ends by short connectors 20. The deposition of the conductor may be effected in any desired way, as by evaporation of metal, such as aluminum, in the desired pattern determined by a mechanical or photographic process, as will be understood by those skilled in the art.

As shown in Fig. 2 the conductors on both rotor and stator of the device of my prior application were inter-connected to form a loop broken at one point to lead out two terminal connections 21. The changes made by the present invention will be apparent from a comparison of Fig. 2 with Figs. 3 and 4 showing the conductor connections according to the present invention. The "primary" member (Fig. 3) which in servomechanisms applications will preferably be the rotor, has the important differences that the winding is closed to form an unbroken loop and the terminal connections 22 and 23 are made at diametrically opposed points on the rotor. The result of this change is to cause the capacitive output voltage to be substantially a sinusoidal function of the rotor angular displacement. As will be explained, this fact can be put to use to provide a coarse system which uses the capacitive voltage for measurement.

It is to be noted that the rotor connections are made in such a way that the current directions in successive conductor bars are the same as in the winding of Fig. 2. Instantaneous current directions are shown by arrows in Figs. 2 and 3. In Fig. 3 the current comes from terminal 22 on a conductor bar 24 and then divides to follow two parallel paths toward the other terminal 23. A single conductor 26 leads to the terminal 23. Thus the conductors 24 and 26 serve as joint conductors for the two paths. By this arrangement, currents in adjacent conductors are in opposite radial directions; more generally, any two conductors spaced by an even number have currents in the same radial direction, and conductors spaced by an odd number have currents in opposite radial directions. The result is to give the same general inductive relationship between rotor and stator bars as exists in the winding of Fig. 2.

The secondary member, preferably the stator, has two windings, designated generally $P_1$ and $P_2$, each formed of zig-zag conductor bars having the same angular bar spacing as the rotor. The purpose of the two windings is to provide a two-phase system, and to that end the bars of winding $P_2$ are angularly displaced from those of $P_1$ by one-half the angular bar-spacing. Both windings are in inductive relationship with the rotor, and accordingly the bars of each stator winding are only about half the radial length of each rotor bar.

It will be understood that the bars are preferably great in number, say of the order of 1000 for each winding, but only a relatively small number are shown in the drawing.

One of the stator windings, say $P_1$, is formed in three sections 28, 30 and 32, each spanning 120°. One end of each section is connected to a common terminal $g$, while the other ends of the several sections are brought out to terminals $a$, $b$ and $c$, respectively.

The second-phase winding $P_2$ is likewise formed in three sections 34, 36 and 38. These three sections are all connected in parallel by connections leading to terminals 40.

Considering now the winding $P_2$, in which all of the sections are connected in parallel, it can be shown that this winding, when used with a rotor winding like that of Fig. 3, is insensitive to capacitance-coupling and is responsive only to inductive coupling between the rotor and stator. To show this theoretically, consider first that the rotor and stator are capacitively equivalent to two conducting bands opposing each other across a narrow gap. Starting with the case of my prior application in which is used a single-path rotor like that shown in Fig. 2 hereof, it can be shown mathematically that there is induced a capacitively-coupled voltage between stator terminals which is represented by the curve $E_c$ in Fig. 5. In that figure, $\theta$ is the angular displacement of the rotor with respect to the stator. The inductive voltage $E_L$ is also shown on this diagram and varies with $\theta$ in a manner depending on the bar spacing. The inductive voltage $E_L$ is usually smaller than, and may be masked by, the capacitance voltage $E_c$.

By substituting a rotor having a winding of the type shown in Fig. 3, in which the terminals are diametrically connected, so that there are two paths from one terminal to the other, the stator voltage $E_c$ across any portion of the stator becomes a function of $\theta$, as shown in Fig. 6. In Fig. 6, $E_c$ is essentially a sinusoidal function of the angle $\theta$.

With the rotor winding of Fig. 3 and a multiple-section stator winding, such as $P_2$ each section of the stator winding acts the same as a whole stator, so far as the capacitance-coupled voltage is concerned. The capacitive voltage in any stator section will be zero when the diameter through the rotor terminals bisects the stator section. Rotation of the rotor causes the capacitive voltage to change to a maximum, back to zero, to a maximum in the reverse phase, and back to zero again, as shown in Fig. 6. Each of the sections goes through the same variation but since successive sections are displaced in position, their voltages are likewise displaced. In Fig. 7 the capacitively-induced voltages in the three sections are shown at $E_{c34}$, $E_{c36}$ and $E_{c38}$ as functions of.

It will be understood that the diagrams of Figs. 6 and 7 represent the relative magnitudes of the several alternating voltages as functions of angular position, and that these voltages change in time at the frequency of the input voltage; in other words, the three voltages shown in Fig. 7 are in the same time phase but differ in space phase by 120°.

Since the sections 34, 36 and 38 are uniform and symmetrical, it can be shown that the presence of three equal voltages displaced in space phase by 120° will result in zero capacitance voltage at the output terminals 40, and that all currents due to the capacitance voltages are localized within the stator sections. Thus the effects of capacitive coupling are substantially eliminated, and only the inductive voltage $E_L$ appears at the terminals 40.

Some residual capacitance effects may appear because of unavoidable asymmetry of the windings or departure of $E_c$ from a true sinusoid, but they are small. Furthermore, they are still further reduced because the diameter-connected rotor results in doubling of the current in the windings by paralleling the two halves of the rotor. The current increase more than doubles the ratio of inductively-coupled voltage to the capacitively-coupled voltages.

The foregoing explanation applies also to the winding $P_1$ if the terminals $a$, $b$ and $c$ are all connected together. Elimination of capacitance-coupling effects occurs because the three sections thereof act identically with those of winding $P_2$. On the other hand, if capacitance coupling effects are desired, they may be obtained either by connecting the three sections of $P_1$ in series or by utilizing the effects of the windings independently.

The principles outlined above apply to a division of the stator windings into any integral number of equal sections. Thus, for $n$ sections, where $n$ is any integer equal to or greater than 2, the several stator voltages are displaced in space phase by $360/n$ degrees. The elimination of capacitance coupling effects is accomplished for all such values of $n$. For $n=2$, the explanation of operation is simple, since the two voltages in each stator winding are merely displaced 180° in space phase. Where only the elimination of capacitance coupling effects is desired, the use of a two-section stator is preferred for simplicity. However, another feature of the invention resides in the use of the same units for both "coarse" and "fine" control, and for the coarse control, $n$ must be greater than 2 in order to obtain an output signal as a function of angular position.

The feature of utilizing the units heretofore described for either coarse or fine control will now be described. It is well-known in the art of servo-mechanisms that best control is obtained from the combination of two systems of different "speeds," i. e. different rates of voltage change with the same rate of rotor angular displacement, more properly referred to as coarse and fine controls. The inductively-induced voltage $E_L$ passes through a complete cycle with a very small rotation of the rotor; this voltage is well adapted for the fine-control system. On the other hand, the capacitive output voltage of a device using the diameter-connected rotor (Fig. 3) and a stator winding of the type shown in Fig. 2 passes through only a single cycle with a 360° rotation of the rotor; this voltage is adapted for the coarse-control system. Operation may thus be on the coarse control (that is, on the system using the capacitive-coupled signal) to the limit of its accuracy, which will necessarily be within the nearest quarter of a cycle of the fine information; then the fine or inductive-signal system may be switched in for measurement within the particular quarter-cycle of the inductive output voltage selected by the coarse system.

The circuit diagrams of Figs. 8 and 9 represent a servomechanism utilizing two of the units heretofore described, and capable by simple switching of being converted from a "coarse" to a "fine" control system. One unit 50 (which may be termed the transmitter) has a rotor 18 fed from any suitable alternating current supply 51, and a stator having the windings $P_1$ and $P_2$. The other unit 52 (which may be termed the receiver or control transformer) is identical, but the corresponding rotor winding and stator sections are primed in Fig. 8. The voltage across the rotor of unit 52 is utilized as an "error signal" which is used for positional control in a manner familiar to those skilled in the servomechanism art.

For a coarse control system, the capacitive variation of voltage in the rotor winding $P_1$ is utilized. The terminals $a$, $b$, and $c$, respectively, of the two units are connected together. The windings $P_2$ are not connected into the system. With this connection of the windings $P_1$, the sections 28, 28', the sections 30, 30' and the sections 32, 32' are all independently connected. The winding sections of each stator constitute three separate "phases" in the sense of space-phase displacement. By reasoning similar to that applicable to synchro theory, it can be shown that the voltage across the terminals of rotor 18' is an "error signal," which is a function of the angular displacement between the two rotors 18 and 18'. This error signal may be utilized for control purposes, as will be understood by those familiar with the servomechanism art.

To convert to a fine control system, the sections of each winding $P_1$ are all connected in parallel by jumpers 54 and 56 tying together the terminals $a$, $b$ and $c$ of the windings $P_1$ of the respective units. This results in the elimination of capacitance effects heretofore described. The windings $P_1$ of the two units are connected together by a wire 58, and the windings $P_2$ are connected by a wire 59. By reason of the half-bar displacement of the two windings $P_1$ and $P_2$ of each stator, this results in a two-phase system, whereby an error signal appears across 18' as a function of the relative angular position of the rotors.

It will be observed that the coarse-control connections of Fig. 8 provide a three-phase system in which each phase covers 120° of the stator, while the fine-control connections provide a two-phase system wherein the phases are separated by 90 electrical degrees (the spacing between two adjacent bars representing 180 electrical degrees). Thus the coarse system executes a complete cycle upon 360° relative movement between rotors, while the fine system executes a complete cycle upon a relative movement of only twice the angular bar spacing.

As is apparent to those skilled in the art, the rotors of devices 50 and 52 are usually made integral with the respective input and output devices, between which the circuit measures the error angle, or angular difference. Electrical connections must be made to the movable rotor. The usual brush and slip-rings impose too much torque reaction for high-precision systems. To take full advantage of the accuracy of angular measurement that is possible with the measuring apparatus herein described, substantially a torqueless take-off from the rotor is required. Figs. 10 and 11 show such a take-off embodied in a measuring device. The error voltage-producing members of the apparatus are the stator 60 and the rotor 62. Windings of the type described earlier are placed on the opposing surfaces 64. Another stator plate 66 is positioned on the opposite side of rotor 62 from the first stator, the two stator plates being clamped to a supporting and spacing flange 70. On the opposing surfaces 68 of stator 66 and rotor 62 are placed identical pairs of concentric rings of conducting material 72 and 74. These rings oppose each other across the air gap and can be made of sufficient area to provide series capacitors through which to make connection to the rotor.

Fig. 12 shows the equivalent circuit diagram of measuring apparatus with capacitive coupling rings. The series capacitors which provide the coupling to the rotor winding are indicated at 72 and 74. The rotor can be made with very small inertia, and the capacitive lead-in coupling permits connection to the rotor without involving counter-torque. With the high frequencies applied to this apparatus, preferably of the order of 100 kilocycles per second, this coupling is sufficient for practical use.

A further advantage accrues from eliminating slip-rings by the orientation of parts shown in Fig. 9. Although angular accuracy of the device described in my prior application is independent of small axial displacements between the rotor and stator windings, some change in voltage gradient or sensitivity will occur. However, with the rotor coupling capacities on the side of the rotor opposite from the measuring windings, an axial shift of the rotor relative to the stator that increases the gradient of the stator output voltage tends to reduce the voltage applied through the capacitive lead-in rings and vice versa; thus, a compensating action is obtained.

It is to be understood that the form of my invention, herewith shown and described, is to be taken as a preferred embodiment, and that various changes in the shape, size and arrangement of parts may be resorted to, without departing from the spirit of my invention, or the scope of the claims below. For example, the elements of my invention might be used in a device in which the relatively rotatable members have concentric cylindrical opposing surfaces.

Having thus described my invention, I claim:

1. Apparatus for electrical measurement comprising two relatively-movable non-ferrous members, a large number of conductors extending back and forth across each of said members and arranged in accurately spaced array, the conductors of the two members being in inductive relationship and having the same angular spacing, each conductor on one of said members being series-connected with the next adjacent conductor to form a closed loop in which adjacent conductors carry currents opposite in direction, said loop having terminal connections at diametrically opposite points on the loop, and the conductors on the other member being similarly series-connected in a loop opened at at least one point to permit terminal connections.

2. Apparatus for electrical measurement comprising two relatively movable non-ferrous members, a large number of conductors extending back and forth across each of said members and arranged in accurately spaced array, the conductors of the two members being in inductive relationship and having the same angular spacing, interconnections on one member series-connecting adjacent conductors to form a closed loop in which adjacent conductors carry currents opposite in direction and terminal connections on the same member at diametrically opposite points on said closed loop, and interconnections on the other member series-connecting adjacent conductors to form $n$ separate groups positioned $360/n$ degrees from one another, in which adjacent conductors carry currents opposite in direction.

3. Apparatus for electrical measurement comprising two relatively movable non-ferrous members, a large number of conductors extending back and forth across each of said members and arranged in accurately spaced array, the conductors of the two members being in inductive relationship and having the same angular spacing, interconnections on one member to series connect adjacent conductors to form a closed loop in which adjacent conductors carry currents opposite in direction and terminal connections on the same member at diametrically opposite points on said closed loop, interconnections on the other member to series connect adjacent conductors to form $n$ separate groups positioned $360/n$ degrees from one another, in which adjacent conductors carry currents opposite in direction, and conducting members to connect the said $n$ groups in parallel.

4. In apparatus for electrical measurement, the combination comprising two relatively-movable windings each made up of a large number of series-connected conductors extending back and forth in a plane, said conductors of the two windings being in inductive relationship and at the same angular spacing, each conductor of one winding being series interconnected with its next adjacent conductor to form one closed loop in which adjacent conductors carry currents opposite in direction with terminal connections at diametrically opposite points on said loop; each conductor of the other winding being series interconnected with its next adjacent conductor to form three separate groups in which adjacent conductors carry currents opposite in direction spaced at 120 degrees from one another.

5. In apparatus for electrical measurement, the combination comprising two relatively-movable windings each made up of a large number of series-connected conductors extending back and forth in a plane, said conductors of the two windings being in inductive relationship and at the same angular spacing, each conductor of one winding being series interconnected with its next adjacent conductor to form one closed loop in which adjacent conductors carry currents opposite in direction with terminal connections at diametrically opposite points on said loop; each conductor of the other winding being series interconnected with its next adjacent conductor to form $n$ separate groups spaced at $360/n$ degrees from one another in which adjacent conductors carry currents opposite in direction and the groups being connected in parallel with one another.

6. In apparatus for electrical measurement, a winding comprising a large number of series-connected conductors extending back and forth and arranged to form a closed conducting loop, in which adjacent conductors carry currents opposite in direction and terminal connections at diametrically opposite points on said closed loop to form two parallel conducting paths, the conductors connected to the terminals forming joint conductors for both parts of the winding.

7. In apparatus for electrical measurement, a winding comprising a large number of conductors disposed radially at regular angular spacing in a single plane, conducting interconnections between conductors to form with said conductors a continuous and closed loop, and terminal connections at diametrically opposite points on said closed loop, to form two parallel conducting paths, the conductors connected to the terminals forming joint conductors for both parts of the winding, a second winding, in inductive relationship with, and movable relative to, the first, comprising an equal number of conductors disposed radially at the same angular spacing in a single parallel plane, and conducting interconnections between conductors of the second winding to form with the conductors $n$ separate groups spaced $360/n$ degrees apart, each group comprising conductors series-connected so that adjacent conductors carry currents opposite in radial direction.

8. In apparatus for electrical measurement, a winding comprising a large number of conductors disposed radially at regular angular spacing in a single plane, conducting interconnections between conductors to form with said conductors a continuous and closed loop, and terminal connections at diametrically opposite points on said closed loop, any two conductors spaced by an even number of spaces, carrying currents in the same radial direction, and any two conductors spaced by an odd number of spaces carrying currents in opposite radial directions, a second winding, in inductive relationship with, and movable relative to, the first, comprising an equal number of conductors disposed radially at the same angular spacing in a single parallel plane, and conducting interconnections between conductors of the second winding to form with the conductors $n$ separate groups spaced $360/n$ degrees apart, each group comprising conductors series-connected so that adjacent conductors carry currents opposite in radial direction.

9. Apparatus for electrical measurement comprising two relatively movable members, each having a winding consisting of a large number of conductors extending back and forth in accurately spaced array, the conductors being series-connected so that adjacent conductors carry currents of opposite direction, the conductors of the two windings having the same spacing, the windings being inductively coupled whereby an induced voltage appears at the terminals of one winding when the other is excited with alternating current, and shunt means for eliminating voltages due to capacitive coupling between the windings by connections within one winding.

10. Apparatus for electrical measurement comprising two relatively movable members, each having a winding consisting of a large number of conductors extending back and forth in accurately spaced array, the conductors being series-connected so that adjacent conductors carry currents of opposite direction, the conductors of the two windings having the same spacing, the windings being inductively coupled whereby an induced voltage appears at the terminals of one winding when the other is excited with alternating current, one of said windings being divided into a number of equal sections connected in parallel, said sections having induced therein capacitively coupled voltages in space phase, the currents due to said voltages being localized within the sections.

ROBERT S. CHILDS.

References Cited in the file of this patent

UNITED STATES PATENTS

| Number | Name | Date |
|---|---|---|
| 264,643 | Edison | Sept. 19, 1882 |
| 679,008 | Steinmetz | July 23, 1901 |
| 714,786 | Day | Dec. 2, 1902 |
| 787,302 | Latour | Apr. 11, 1905 |
| 1,268,712 | Harle | June 4, 1918 |
| 1,630,757 | Perkins | May 31, 1927 |
| 1,768,966 | Tanner | July 1, 1930 |
| 1,937,375 | Woodward | Nov. 28, 1933 |
| 2,038,059 | Reichel | Apr. 21, 1936 |
| 2,400,619 | Woodward | May 21, 1946 |
| 2,401,344 | Espely | June 4, 1946 |
| 2,402,603 | Clark | June 25, 1946 |
| 2,409,876 | Martin | Oct. 22, 1946 |
| 2,426,226 | Labin | Aug. 26, 1947 |

FOREIGN PATENTS

| Number | Country | Date |
|---|---|---|
| 5,562 of 1890 | Great Britain | Feb. 11, 1891 |